No. 615,200. Patented Nov. 29, 1898.
F. H. RICHARDS.
AUTOMATIC WEIGHING MACHINE.
(Application filed Dec. 13, 1897.)
(No Model.) 6 Sheets—Sheet 1.

Witnesses
Chas. F. Schmelz
Fred. J. Dole.

Inventor
F. H. Richards

No. 615,200. Patented Nov. 29, 1898.
F. H. RICHARDS.
AUTOMATIC WEIGHING MACHINE.
(Application filed Dec. 13, 1897.)

(No Model.) 6 Sheets—Sheet 3.

Witnesses:
Chas. F. Schmelz
Fred. J. Dole.

Inventor:
F. H. Richards.

No. 615,200. Patented Nov. 29, 1898.
F. H. RICHARDS.
AUTOMATIC WEIGHING MACHINE.
(Application filed Dec. 13, 1897.)
(No Model.) 6 Sheets—Sheet 5.

Witnesses:
Chas. F. Schmelz
Fred. J. Dole.

Inventor:
F. H. Richards

No. 615,200. Patented Nov. 29, 1898.
F. H. RICHARDS.
AUTOMATIC WEIGHING MACHINE.
(Application filed Dec. 13, 1897.)
(No Model.) 6 Sheets—Sheet 6.
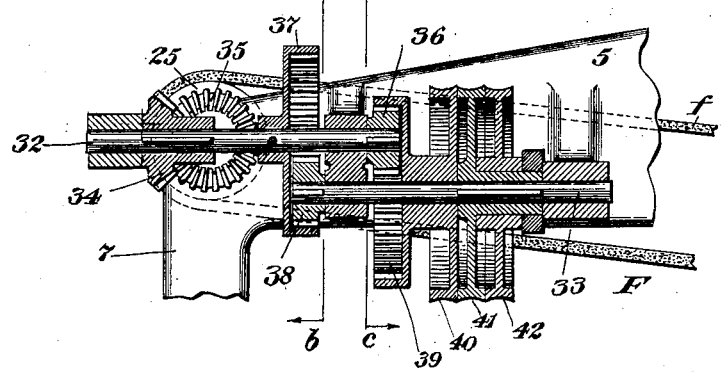
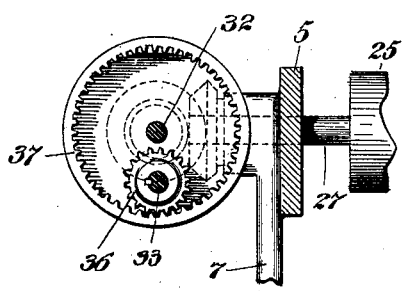
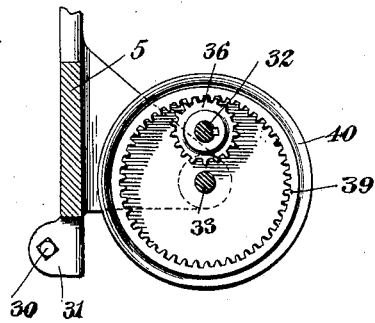
Witnesses:
Inventor:

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 615,200, dated November 29, 1898.

Application filed December 13, 1897. Serial No. 661,620. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to automatic weighing-machines of that class especially adapted for the automatic weighing of slow-running or sluggish materials and in which stream-supplying means including an endless-band feeder is provided for force-feeding material to the load-receiver.

One object of the invention is to provide, in connection with the stream-supplying means, an improved cut-off device comprehending two coöperatively-connected cut-off valves having independent axes, one in advance of and one below the feeder and supported for simultaneous oscillatory movements in corresponding directions toward and away from each other in intersecting planes and to provide improved means for actuating and for controlling the movements of said cut-off valves.

A further object of the invention is to provide, in connection with a load-receiver having a closer and with stream-supplying means, a cut-off valve and interlocking instrumentalities of improved construction and organization for reciprocally blocking the opening movements of the valve and closer.

Figure 1:
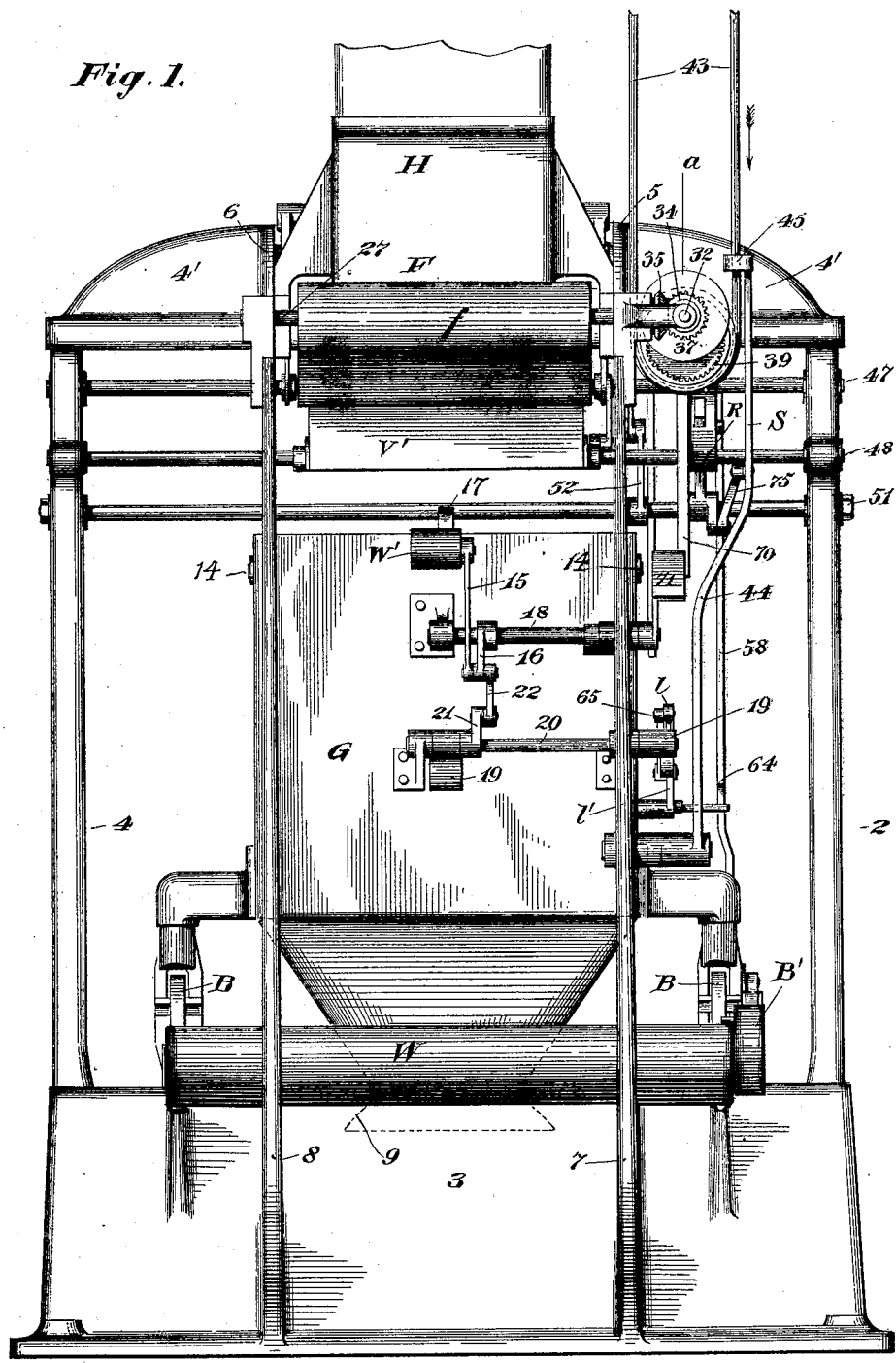

In the drawings accompanying and forming part of this specification, Figure 1 is a rear elevation of an automatic weighing-machine embodying my present improvements. Figs. 2, 3, 4, and 5 are side elevations of the weighing-machine as seen from the right hand in Fig. 1, showing, respectively, four successive positions of the several parts of the weighing-machine during one cycle of operations thereof. Fig. 6 is an enlarged vertical longitudinal section taken on the line corresponding with the dotted line $a\,a$, Fig. 1, of the differential-speed feeder-actuating mechanism. Fig. 7 is a cross-section of a portion of the feeder-actuating mechanism, taken on the line corresponding with the line $b\,b$, Fig. 6, showing the parts at the left of said line. Fig. 8 is a similar cross-section taken on the line corresponding with the dotted line $c\,c$, Fig. 6, showing the parts at the right hand of said line.

Similar characters designate like parts in all the figures of the drawings.

The framework for supporting the fixed and operative parts of the weighing-machine may be of any suitable construction and comprises in the form thereof shown in the accompanying drawings the main frame including the chambered supporting-base 3, two vertical side standards 2 and 4, supported on the chambered base 3, and a top frame including a top plate or cross-beam 4', and two horizontal beams or side plates 5 and 6, respectively extending rearwardly from the top plate 4' and supported at their outer or rear ends upon the upper ends of uprights 7 and 8, which are in turn supported at their lower ends upon the base 3 of the machine.

The stream-supplying means of the weighing-machine preferably comprises a supply-hopper (designated in a general way by H) supported in a suitable manner on the top frame and an endless-band feeder (designated in a general way by F) supported below said hopper. The lower edges of the supply-hopper H are shown inclined downwardly toward the front edge thereof, and the feeder is shown supported at a corresponding inclination.

The weighing mechanism *per se* comprises, as usual, a load-receiver or bucket and supporting-beam mechanism therefor, such weighing mechanism being in the present instance substantially the same in general construction, organization, and mode of operation as that described in Patent No. 548,840, granted to me October 29, 1895, to which reference may be had.

Inasmuch as the construction and organization of the framework, load-receiver, and the beam mechanism may be variously modified without departure from this invention and as my present improvements are applicable to weighing mechanisms of different constructions and organizations a brief description of these elements is deemed sufficient for an understanding of my present invention, reference being had to Patent No. 548,840 for a more detailed description thereof.

The bucket, which is designated in a general way by G, is pivotally supported on suitable knife-edges on the poising ends of a scale-beam B, which in turn is mounted in a similar manner on the base 3 of the framework, said beam consisting of two parallel arms located one at each side of the load-receiver and connected at their outer ends by a counterweight W.

The load-receiver G is shown having a centrally-recessed conical discharge end, the lower edge of which is flared outwardly at 9 to provide a conical seat for the closer. The closer L of the load-receiver is shown of conical form, the apex thereof normally extending within the lower portion of the load-receiver, and said closer will in practice be furnished with a peripheral packing-ring 10 of flexible material, adapted when the closer is in the shut position (shown in dotted lines, Fig. 2) for bearing against the inner face of the flange or seat to secure a tight joint.

The means for retaining the closer normally in its shut position comprises, in the preferred form thereof shown in the accompanying drawings, a vertically-disposed sustaining-rod 12, fixed at its lower end to the closer and pivotally secured at its upper end to a rocker-arm 13 on a rock-shaft 14, journaled at opposite ends thereof in the side wall of the load-receiver; an inverted toggle (designated in a general way by T) comprising two toggle-links 15 and 16, pivotally connected together at their inner ends and the former of which is pivotally connected at its outer end to the outer end of a counterweighted rocker-arm 17, fixed to the rock-shaft 14 and disposed oppositely to the arm 13, fixed to said shaft, and the latter, 16, of which is fixed to a rock-shaft or rocker 18, journaled in bearings on a bracket on the rear wall of the load-receiver; a counterweighted angle-lever 19, fixed to a rock-shaft 20, journaled in bearings on the rear wall of the load-receiver below the rock-shaft 18 and having a latch-engaging arm 19'; an actuating-connector between the toggle T and lever 19, consisting of a crank-arm 21, fixed to the rock-shaft 20, and a link 22, pivotally connected at its lower end to the other outer end of the arm and at its opposite end to the connected ends of the links 15 and 16 of the toggle device, and a closer-latch $l$, pivotally supported on the side wall of the load-receiver and having a catch 23 for engaging the outer end of the latch-engaging arm 19', and which latch, through the medium of the arm 19', lever 19, toggle T, and connections, normally holds the closer against opening movement.

The closer-shutting actuator in the present instance is shown as a counterweight W', carried on the rear end of the arm 17, fixed to the rock-shaft 14, said weight normally tending to exert a lifting stress upon the closer-sustaining rod 12.

In connection with the closer-latch $l$ I have provided a latch-tripper which is designated by $l'$, the construction, organization, and operation of which will be hereinafter described.

The feeder F, in the preferred form thereof shown most clearly in Figs. 1, 2, 6, and 7 of the drawings, comprises an endless feed band or belt $f$ and two belt rollers or carriers 25 and 26, respectively, supported one in the rear and one in advance of the hopper H in different horizontal planes on shafts 27 and 28, respectively, the former of which is journaled in bearings on the outer ends of the horizontal parallel beams or side plates 5 and 6 and the latter of which is supported between and at the lower ends of vertically-disposed arms of an oscillatory carrier 29, (one arm only of which is shown,) pivotally supported near the upper end thereof for adjustment between the side plates 5 and 6 in advance of the forward end of the hopper H.

In connection with the pivotally-supported carrier 29 I have provided an adjusting device, shown in the nature of a screw-bolt 30, having a screw-threaded bearing in a flange 31, depending from the lower edge of one of the side frames, as 5, and which bolt bears at its inner end against the lower end of one of the arms of the carrier, whereby on adjustment of said bolt forward the roll 26 will be moved farther away from the roll 25 to draw the belt or band $f$ taut.

Inasmuch as the hopper H is strictly a "stream-supplying means" and the feeder F, while it coöperates with the hopper for supplying material to the load-receiver, is strictly a "stream-controller" it is distinctly to be understood that the phrase "stream-supplying means" as employed in the claims designates a supply-hopper or equivalent, unless employed in connection with a qualifying phrase, such as "including a power-driven feeder," in which case "stream-supplying means" implies a "hopper" and a "power-driven feeder" and must be so construed.

Figure 2:
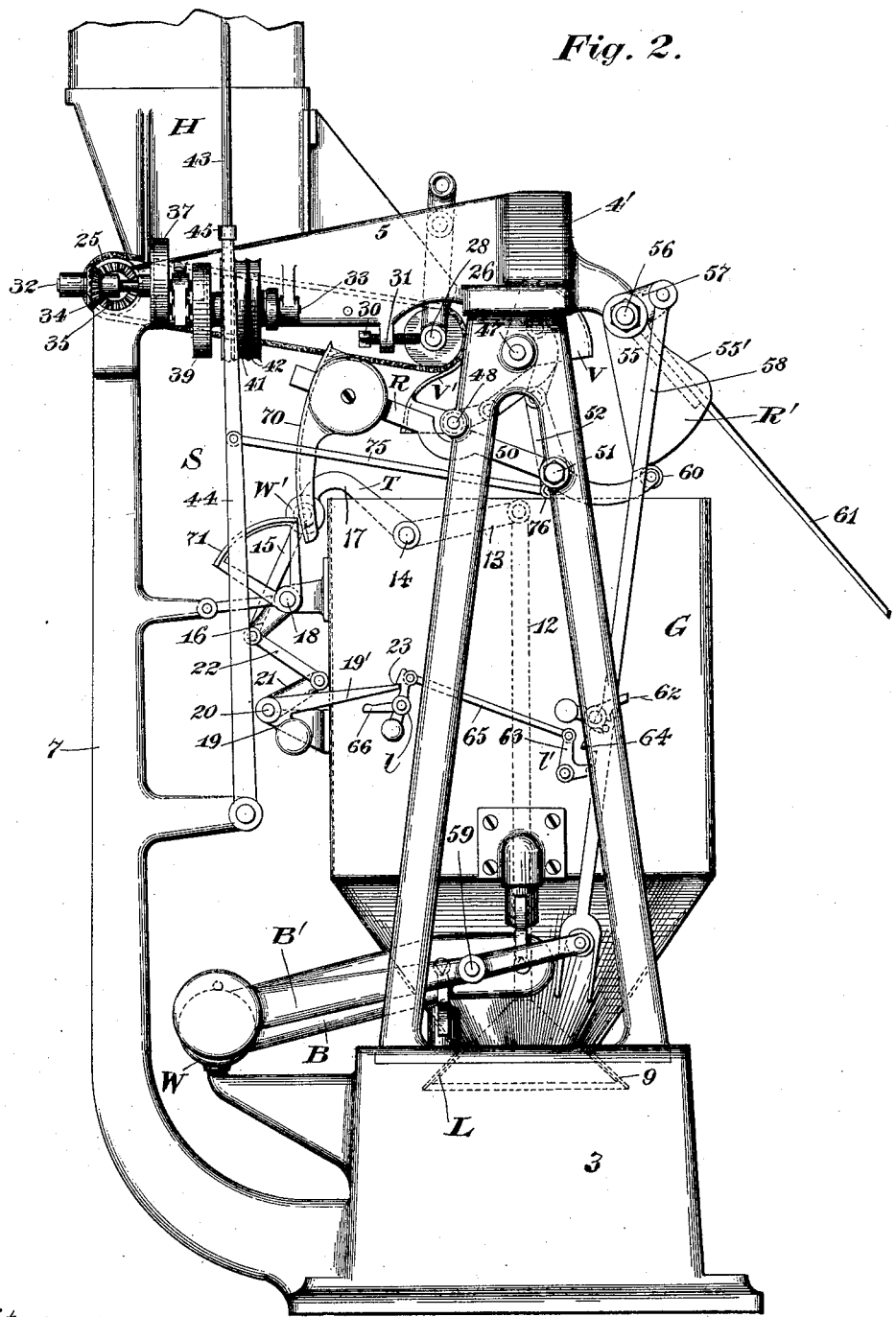

As a means for imparting a material-feeding movement to the upper run of the endless belt $f$ of the feeder F, I have provided differential-speed feeder-actuating mechanism, which, in the preferred form thereof shown most clearly in Figs. 1, 2, and 6 of the drawings, comprises two horizontally-disposed parallel shafts 32 and 33, supported in suitable bearings on the side plate 5 of the top frame of the machine; a bevel-gear 34, fixed to the outer end of the first shaft 32 and meshing with a bevel-gear 35, fixed to the end of the shaft 27 of the feeder; a pinion 36, fixed to the inner end of the first shaft 32; a relatively large internal gear 37, fixed to the shaft 32 intermediate the bevel-gear 34 and pinion 36; a pinion 38, fixed to the inner end of the second shaft 33 and meshing with the internal bevel-gear 37 at a point below the axis thereof; a relatively large internal gear 39, loosely mounted upon the second shaft 33 and meshing with the pinion 36 of the shaft 32; a sheave 40 on the hub of the loose internal gear 39; a sheave 41, fixed to the shaft 33, and a sheave 42, loosely mounted upon the hub of the sheave 41, all of said sheaves being preferably of the same diameter and set side by side in position to be driven, successively or alternately, by one belt or band 43, shiftable from one to another sheave. This band may be driven from any suitable source of power. (Not shown.)

By the construction and organization of differential-speed feeder-actuating mechanism just described it will be seen that when the band 43 is on and is driving the sheave 40 the internal gear 39 will be driven at the same rate of speed and will drive the pinion 36, fixed to the shaft 32, at an increased velocity, which shaft, through the medium of the intermeshing bevel-gears 34 and 35, drives the belt $f$ at a high velocity, the internal gear 37, pinion 38, shaft 33, and connected sheave 41 being of course simultaneously driven, but having no effect on the shaft 32. When the belt is shifted from the pulley 40 to the pulley 41, the belt $f$ will be driven at a slow speed through the medium of the shaft 33, which is fixedly connected to the pulley 41 and the pinion 38, fixed to the end of said shaft and meshing with the internal gear 37, fixed to the shaft 32, the pinion 36, internal gear 39, and connected sheave 40 being simultaneously but ineffectively rotated.

For the purpose of changing the effective velocity of the material-supporting run of the feed-band $f$ to reduce the volume of the material supplied to the load-receiver in a given time in accordance with the requirements as determined by the position of the load-receiver I have provided in operative relation with the feeder-actuating mechanism a belt-shipper (designated in a general way by S) which is in the nature of a shipper-lever 44, pivotally supported at its lower end on a bracket on one of the uprights of the frame and having a band-engaging device or bifurcated projection 45 at the upper end thereof, which engages and is adapted on an oscillatory movement of the shipper 44 for shifting the band or belt 43 from one to another sheave. The belt-shifter is controlled in its effective movements indirectly by the weighing mechanism, and has oscillatory belt-shifting movements imparted thereto at predetermined points in the descending and ascending movements of the load-receiver, as will be hereinafter more fully described.

As a means for positively cutting off the supply of material to the load-receiver immediately upon the arrival of said load-receiver at a predetermined point in the descending movement thereof I have provided in operative relation with the discharge end of the feeder a cut-off device which, in the preferred form thereof shown in the accompanying drawings, comprises two coöperatively-connected cut-off plates or valves $v$ and $v'$, pivotally supported one in advance and one below the discharge end of the feeder for oscillatory movements in corresponding directions and in intersecting arcs toward and away from one another and into and out of overlapping relation, and an actuating-connector 46 between the two valves, and I have provided in connection with said cut-off device valve-actuating mechanism including a valve-shutting actuator (designated in a general way by R) and a valve-opening actuator, (designated in a general way by R'.)

The valve $v$ is shown as an ordinary scoop-valve fixed to a rock-shaft 47, journaled in the side frames 2 and 4 in advance of the feeder-shaft 28, and the valve $v'$ is shown as an ordinary scoop-valve fixed in an inverted position to the shaft 48, journaled in the side frames below and in substantial vertical alinement with the discharge end of the feeder, said valve having the material-supporting plate thereof extended considerably beyond the front edge of its side wall, so that when the valves $v$ and $v'$ are in the closed positions (shown in Fig. 4) said plate will bridge the space between the discharge end of the feeder and the material-supporting plate of the valve $v$. This valve $v'$ is so disposed that when the two valves are in the closed positions thereof (shown in Fig. 4) the outer face of the material-supporting plate of the valve $v'$ will extend from the point contiguous to the lower run of the feeder to a point considerably in advance of and below the discharge end of said feeder, said outer face of the material-supporting plate curving outwardly and downwardly and constituting practically an inclined bridge for directing any material discharged from the feeder into the valve $v$, as will be readily understood by a comparison of the several figures of the drawings.

The actuating-connector between the two valves $v$ and $v'$ is shown as a link 46, pivotally secured, as at 46'', at one end to the valve $v$ at a point slightly remote from the axis of oscillation thereof and pivotally secured at its opposite end to the crank-arm 46', fixed to the rock-shaft 48, to which the valve $v'$ is secured, the dispositions of the link 46 and crank-arm 46' being such that on an oscillatory movement of one valve, as $v$, an oscillatory movement will be simultaneously imparted to the other valve, as $v'$, the valves moving in corresponding directions, but in intersecting arcs.

The valve-actuating mechanism includes two coöperative actuators, one of which is termed the "valve-opening" actuator and the other of which is termed the "valve-closing" actuator, and the former of which retards the movement of the latter during the descending movement of the load-receiver and imparts a valve-opening movement to said latter subsequent to the discharge of a load from the load-receiver.

The valve-shutting actuator R, in the form thereof shown in the accompanying drawings, comprises a counterweighted lever 50, fixed to a rock-shaft 51, journaled in the side frames at a point below the valve $v$; a rocker-arm 52, fixed to the shaft 51, and a link 53, pivotally connected at its lower end, as at 53', to the outer end of said rocker-arm and pivoted at its upper end to the valve $v$ at the point $46''$, coincident with the point of connection of the link 36 with said valve, the point at which the link 53 is connected to the rocker-arm 52 being intermediate the points $46''$ and $53'$, where the link 46 is connected to the valve $v'$ and the rocker-arm $46'$ of the valve $v'$; and the valve-opening actuator $R'$, in the form thereof shown in the accompanying drawings, comprises a lever-actuating cam 55, coöperative with the valve-shutting lever and mounted on a rock-shaft 56, journaled in a bracket on the side frames of the machine; a rocker-arm 57, fixed to the rock-shaft 56; a thrust-rod 58, pivotally connected at its upper end to the rocker-arm 57 and supported at its lower end on the forward end of a counterweighted beam $B'$, which is fulcrumed intermediate its ends at 59 on the poising end of the scale-beam B in the usual manner.

The valve-opening actuator illustrated in the accompanying drawings is of substantially the same general construction, organization, and operation as the valve-opening actuator in Patent No. 548,840 referred to.

The auxiliary valve-actuating beam $B'$ has a pin which projects into the path of movement of the scale-beam B, and the counterweighted end of said beam $B'$ is elevated by said scale-beam B during the descending movement of the load-receiver in the usual manner.

Figure 5:
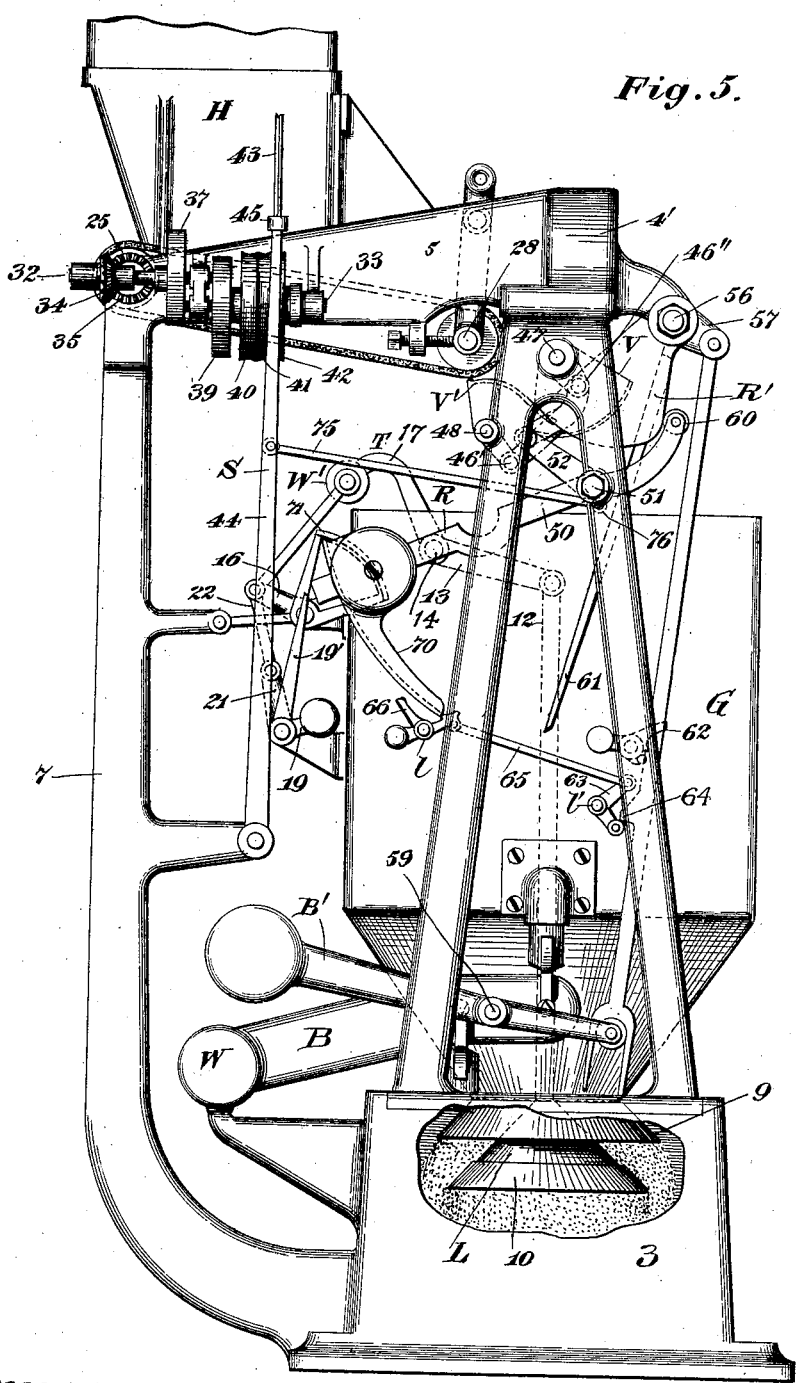

The working face $55'$ of the valve-opening cam 55 is engaged by a roller 60 on the forward non-counterweighted end of the valve-shutting actuator-lever 50, and this working face is of such construction that on the descent of the counterweighted end of the auxiliary beam $B'$ (which will be effected after the discharge of the load and will cause the cam to be moved in the direction of the arrow in Fig. 5) it will effect a valve-opening movement of the actuating-lever 50, shifting said lever from the position thereof shown in Fig. 5 to that shown in Fig. 2, and will, during the descent of the load-receiver and on the gradual ascent of the counterweighted end of the auxiliary beam $B'$ from the position shown in Fig. 2 to that shown in Fig. 5, retard the valve-shutting movement of the actuator, allowing said actuator to gradually close the valves.

The rock-shaft 56 of the cam 55 is furnished with a pointer or depending arm 61, which at a predetermined point in the closing movement of the valves engages a by-pass 62, which prevents a further closing movement of the valve until the load-receiver and by-pass has descended sufficiently to release the arm 61, the construction, organization, and operation of this arm and by-pass being substantially the same as like parts in the Patent No. 548,840 referred to.

As a means for tripping the closer-latch $l$, I have provided the latch-tripping device $l'$, which in the form thereof shown in the accompanying drawings comprises an angle-lever 63, having an arm disposed in the path of movement of a projection 64 on the thrust-rod 58 and having another arm pivotally connected to the latch $l$ by a link 65.

The latch $l$ is shown provided with a rearwardly-extending arm 66, disposed in such a position that on the release of the latch $l$ from engagement with the latch-engaging arm $19'$ said arm will strike the arm $19'$ and force the same upward, and thereby start the closer-opening movement of the toggle T.

As a means for blocking the cut-off valves and the closer alternately against opening movement, I have provided interlocking instrumentalities which, in the preferred form thereof shown in the accompanying drawings, comprise two coöperative stop devices or members 70 and 71, the former of which is shown as a curved plate or arm fixed to the valve-actuating lever 50 and the other of which is shown as a segment disk or rocker fixed to the rock-shaft 18, to which one link of the toggle T is secured. The stop members 70 and 71 are so disposed relatively to each other that when the valves $v$ and $v'$ are in their open positions and the closer L is in its closed position, as illustrated in Fig. 2, the working face of the stop member 70 will intersect the path of the stop member 71 and will prevent a closer-opening movement of the stop 71 and valve-sustaining toggle T, and when the valves and closer are in their closed and open positions, respectively, as illustrated in Fig. 5, the working face of the stop member 71 will intersect the path of the stop member 70 and will prevent a valve-opening movement of the actuator 50.

Figure 3:
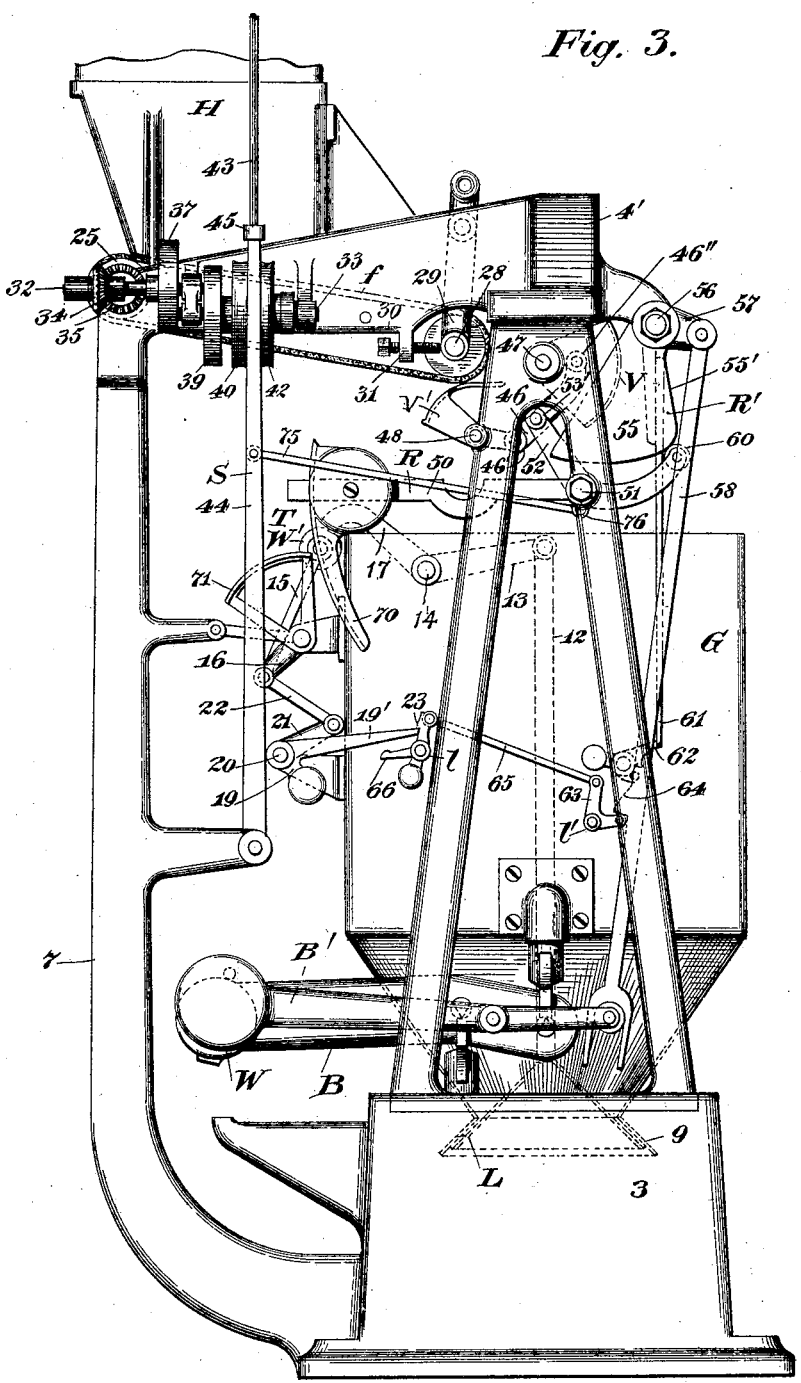
Figure 4:
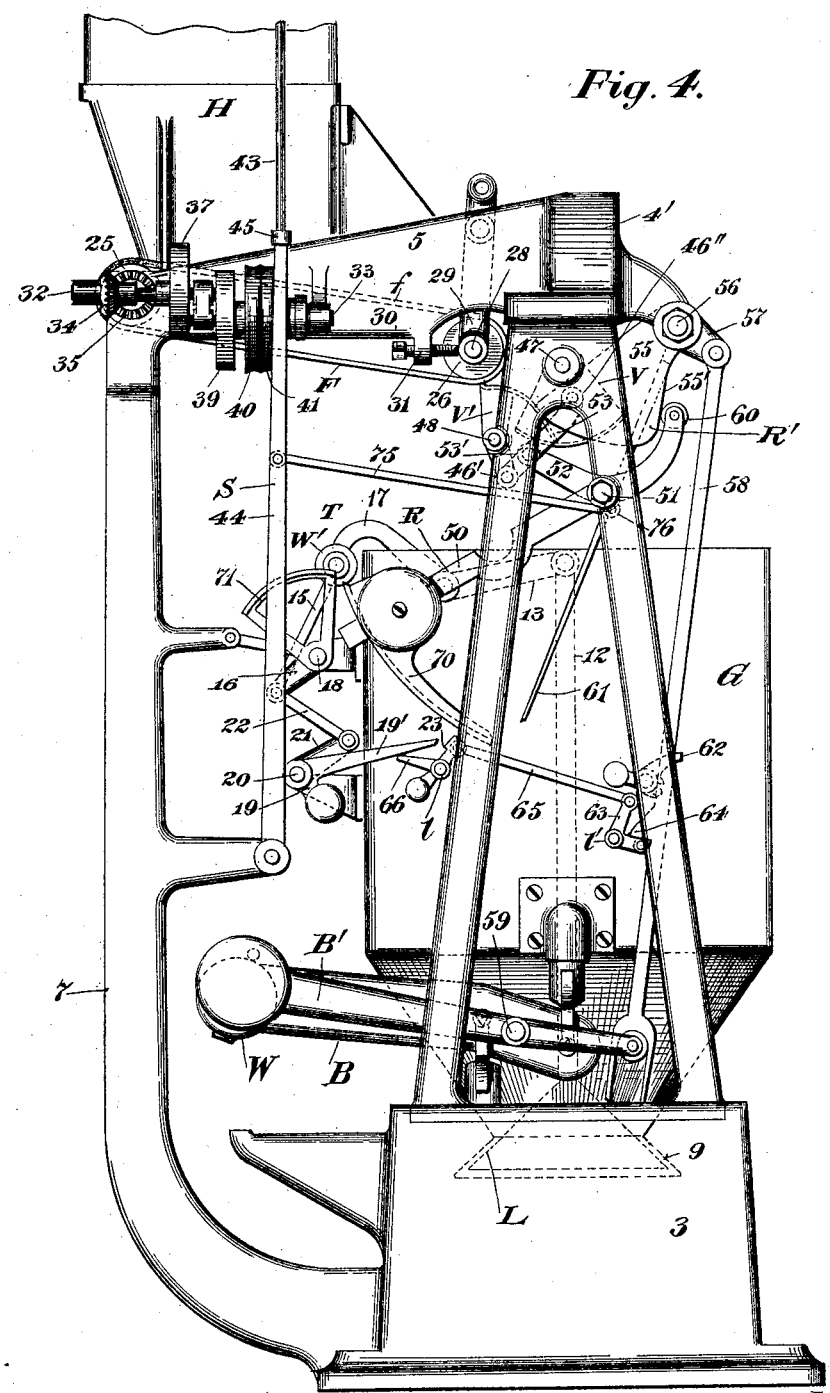

As a means for controlling the operation of the belt-shipper from the weighing mechanism, the belt-shipper is connected to the rock-shaft 51, which carries the valve-actuating lever by means of the link 75, which is pivotally connected at its rear end to said belt-shipper and pivotally connected at its front end to a rocker-arm 76 on said rock-shaft, said rocker-arm and link being so disposed with relation to the valve-actuating lever 50 that when the valves have arrived at the position illustrated in Fig. 3 (at which point the load-receiver is supposed to have arrived at its poised position) the sheave-driving band 43 will have been shifted from the pulley 40 to the pulley 41, and immediately upon the arrival of the valves $v$ and $v'$ at the cut-off position illustrated in Fig. 4 said band will be shifted from the sheave 41 to the loose sheave 42.

During the first stage of the closing or cut-off movements of the valves $v$ and $v'$ the band 43 will drive the sheave 40, and a material-feeding movement of high velocity will be imparted to the upper run of the feed-belt of the feeder, and concurrently with the arrival of the valves $v$ and $v'$ at their intermediate positions and on the arrival of the load-receiver at its poised position, as illustrated in Fig. 3, the band 43 will be shifted to the sheave 41, and a material-feeding movement of decreased velocity will be imparted to the upper run of the feed-belt, and which velocity will be maintained until the band 43 is shifted to the loose sheave 42 during the last stage of the cut-off movement of the valves, which shifting of the belt to the loose pulley will stop the operation of the feed-belt, the valves at this time being in position to receive the drip or drizzle which may flow over the discharge end of the feed-belt after the feed operation thereof has been arrested.

The term "sheave" herein employed implies any suitable band wheel or pulley and should be so construed in the claims.

Having described my invention, I claim—

1. The combination, with stream-supplying means, of a coöperative cut-off device comprehending two cut-off plates simultaneously movable in corresponding directions through intersecting arcs from and toward each other.

2. The combination, with stream-supplying means, of a coöperative cut-off device comprehending two cut-off plates having independent axes of movement; means for oscillating the plate; and an actuating-connector between the two plates, so constructed and organized that on an oscillatory movement of one plate both plates will have simultaneous oscillatory movements in intersecting arcs and in corresponding directions from, and into, overlapping relation.

3. The combination, with stream-supplying means, of a coöperative cut-off device comprehending two cut-off plates having independent axes of movement; means for imparting to said plates simultaneous oscillatory movements in intersecting arcs and in corresponding directions into, and out from, overlapping relation, and including a counterweighted lever in operative connection with one cut-off plate; and a link connecting the two cut-off plates.

4. The combination, with stream-supplying means, of a coöperative cut-off device including two shiftably-connected cut-off plates having independent axes of movement; actuating mechanism for imparting to said plates oscillatory movements toward and from each other in intersecting arcs and in corresponding directions, and consisting of a counterweighted lever; and a link pivotally connecting said lever and one of the cut-off plates.

5. The combination, with stream-supplying means, of a coöperative cut-off device including two shiftably-connected cut-off plates having independent axes of movement; actuating mechanism for imparting to said plates oscillatory movements toward and from each other in intersecting arcs and in corresponding directions, and including a weighted lever fulcrumed intermediate its ends and having a crank-arm; and a link pivotally connected at one end to said crank-arm and at its opposite end to one of the cut-off plates at one side the axis of oscillation thereof.

6. The combination, with stream-supplying means including an endless power-driven feeder, of a coöperative cut-off device comprising two cut-off plates, one of which plates is pivotally supported in advance of the discharge end of the feeder and is shiftable to a point below and in advance of the lower run of said feeder, and the other of which plates is supported below the discharge end of the feeder and shiftable to a point in advance of the feeder and bridges the space between the discharge end of said feeder and the other cut-off plate; a shiftable actuating-connector between the two plates; and a counterweighted lever in shiftable connection with one of said plates.

7. The combination, with a supply-hopper, of a power-driven feeder; a coöperative cut-off device including two independently-pivoted valves or cut-off plates; means for shifting said valves toward each other and across the path of flow of the gravitating material; and means controlled by the valve-actuating means for actuating the feeder at different velocities at predetermined points in the movements of the valves.

8. The combination, with a supply-hopper, of an endless-band feeder supported below said hopper; two oscillatory cut-off valves having independent axes of movement one in advance of, and one below, the discharge end of the feeder; means for imparting to said valves simultaneous oscillatory movements in intersecting arcs and in corresponding directions into, and out from, overlapping relation; and differential-speed feeder-actuating mechanism in connection with the feeder and effective, at predetermined points in the movements of the valves, for imparting movements of different velocities to said feeder.

9. The combination, with weighing mechanism including a load-receiver and with a supply-hopper, of an endless-band feeder disposed below the supply-hopper with its discharge end above the receiving end of the receiver; differential driving mechanism in connection with said feeder; two operatively-connected, independently-supported cut-off valves disposed for oscillatory movement one in advance, and the other below, the discharge end of the feeder; valve-actuating means controlled by the weighing mechanism for imparting to said valves simultaneous oscillatory movements in intersecting arcs and in corresponding directions toward and away from each other; and means controlled by the valve-actuating means for effecting a change in the velocity of the feeder at different points in the movements of the valves.

10. The combination, with weighing mechanism including a load-receiver and with stream-supplying means including an endless-band feeder, of differential driving mechanism in operative connection with the feeder and embodying a series of sheaves; two cut-off valves disposed in operative relation with the discharge end of the feeder, and one of which is disposed in advance of said discharge end, and the other of which is disposed to bridge the space between the advance valve and the discharge end of said feeder; valve actuating and connecting instrumentalities controlled by the weighing mechanism and effective, on the descent of the load-receiver, for imparting simultaneous cut-off movements to said valves; a driving-belt in connection with one sheave of the differential driving mechanism; and a belt-shipper in operative connection with the valve-actuating means and effective, at predetermined points in the movements of the valves, for shifting the belt from one sheave to another to change the velocity of the feeder.

11. The combination, with weighing mechanism including a load-receiver and with stream-supplying means including an endless power-driven feeder, of two coöperatively-connected cut-off valves having independent axes of movement disposed in different horizontal planes and adapted to have cut-off movements toward each other crosswise of the path of the stream as it is discharged from the feeder; a counterweighted valve-actuator controlled by the weighing mechanism and effective, on the descending movement of the load-receiver, for imparting to said valves cut-off movements in intersecting arcs; and means in connection with, and controlled by, the valve-actuator for imparting material-feeding movements to the feeder of relatively different velocities at predetermined points in the cut-off movements of the valves.

12. The combination, with weighing mechanism including a load-receiver having a closer and with stream-supplying means of a coöperative cut-off valve; a valve-closing actuator; and two coöperative stop devices one of which is carried by the valve-closing actuator and the other of which is connected to the closer, and which stop devices are reciprocally effective for blocking the opening movements of the valve and closer alternately.

13. The combination, with a load-receiver having a gravitative closer and with stream-supplying means, of an oscillatory cut-off valve coöperative with the supply means; a counterweighted valve-closing actuator; means for locking the closer normally in its closed position; means for releasing said closer; and two coöperative stop devices one of which is fixed to, and is movable with, the valve-closing actuator and the other of which is connected to, and is movable with, the closer, and which stop devices are effective for blocking the opening movements of the valve and closer alternately.

14. The combination, with weighing mechanism including a load-receiver having a closer and with stream-supplying means, of a coöperative cut-off valve; a counterweighted valve-closing actuator having a stop member in fixed connection therewith; a closer stop member pivotally supported on the load-receiver in position to coöperate with the valve-actuator stop member and closer; a latch for locking the closer normally in its closed position; and means effective, on the closure of the valve and at a predetermined point in the movement of the load-receiver, for tripping the latch to release the closer, the organization of the two stop members being such that they will coöperate to block the opening movements of the valve and closer alternately.

15. The combination, with weighing mechanism including a load-receiver having a gravitative closer and with stream-supplying means including an endless-band feeder, of two coöperatively-connected oscillatory cut-off valves coöperative with said feeder; actuating mechanism in connection with said valve and effective, at predetermined points in the movements of the load-receiver, for imparting cut-off and opening movements alternately to said valves; two coöperative reciprocally-effective stop devices one of which constitutes a part of, and is operative with, the valve-actuating mechanism and the other of which is operatively connected with the closer; a latch for locking the closer normally against opening movement; and means operative with a member of the valve-actuating mechanism, at a predetermined point in the movement of the load-receiver, for releasing the latch to facilitate an opening movement of the closer.

16. The combination, with a load-receiver having a gravitative closer and with stream-supplying means, of an oscillatory cut-off valve in operative relation with the stream-supplying means; a valve-actuator including a counterweighted lever having a stop member thereon; a closer stop member pivotally supported for oscillatory movement on the load-receiver in coöperative relation with the stop member of the actuating-lever; a toggle device connecting the closer stop member and closer and including a closer-shutting actuator; an oscillatory lever pivotally supported on the load-receiver below the closer stop member and pivotally connected with the toggle device; a latch-arm fixed to said lever; a latch pivotally supported on the load-receiver and normally engaging the latch-arm and holding the closer-toggle against closer-opening movement; and means for releasing said latch for facilitating an opening movement of the closer.

17. The combination, with a load-receiver having a gravitative closer, of a rock-shaft supported on the load-receiver and having a rocker-arm; a sustaining-rod connecting the rocker-arm and closer; an inverted toggle one link of which is pivotally connected with the load-receiver at one side thereof and the other link of which is connected to the rock-shaft; a closer-shutting actuator in connection with said closer; and means embodying a latch in operative connection with the closer-toggle and effective normally for holding the closer against opening movement.

18. The combination, with weighing mechanism including a reciprocatory load-receiver having a closer and with stream-supplying means including a power-driven endless-band feeder, of two coöperatively-connected cut-off valves pivotally supported one in advance of, and one below, the discharge end of the feeder; actuating mechanism including a counterweighted lever for imparting to said valves simultaneous oscillatory movements in intersecting planes and toward each other; interlocking mechanism between the valve and closer and comprising two coöperative stop devices one of which is carried by, and is operative with, the lever of the valve-actuating mechanism and the other of which is pivotally supported on the load-receiver at one side thereof and has an inverted toggle in operative connection with the closer; a latch-engaging arm pivoted on the load-receiver; an actuating-connector between the latch-arm and toggle; a latch pivoted on the load-receiver and normally engaging the latch-arm, whereby the closer is normally held in its closed position; a closer-shutting actuator in operative connection with the closer; and means operative, at a predetermined point in the movement of the load-receiver, for releasing the latch to facilitate an opening movement of the closer.

19. The combination, with weighing mechanism including a load-receiver and with stream-supplying means including an endless-band feeder having a driving-shaft, of differential-speed feeder-actuating mechanism comprehending two parallel shafts the first of which is in geared connection with the driving-shaft of the feeder, a large and a small gear fixed to said first shaft, and a small gear fixed to said second shaft and meshing with the large gear on the first shaft; a large gear loosely mounted on said second shaft and meshing with the small gear of said first shaft; a series of sheaves one of which is fixed to the loose gear on the second shaft, another of which is fixed to said second shaft direct, and another of which is supported for idle movement; a band in connection with one of said sheaves; and a shifting device controlled by the weighing mechanism for shifting the band from one to another sheave at predetermined points in the movements of the load-receiver to change the velocity of the feeder.

20. The combination, with weighing mechanism including a load-receiver and with a supply-hopper, of an endless-band feeder supported below the supply-hopper and having carrier-rolls whose shafts are journaled in suitable bearings in the framework; a bevel-gear fixed to one of the shafts of the feeder; a horizontally-disposed driven shaft journaled in suitable bearings in the framework and having a bevel-gear meshing with the bevel-gear of the feeder-shaft; a pinion fixed to the inner end of the driven shaft; a relatively large internal gear fixed to the driven shaft intermediate the pinion and bevel-gear; a driving-shaft supported in suitable bearings on the framework below said driven shaft and having a pinion meshing with the internal gear of said driven shaft; a driving-sheave fixed to the driving-shaft; an internal gear of large diameter loosely mounted on the driving-shaft between the sheave and the pinion thereof and meshing with the pinion of the driven shaft and having a sheave; a sheave loosely mounted on the hub of the sheave fixed to the driving-shaft; a band or belt in connection with one of the sheaves; and a belt-shifter controlled by the weighing mechanism for shifting the belt from one to another sheave at predetermined points in the movements of the load-receiver to change the velocity of the feeder.

21. The combination, with weighing mechanism including a load-receiver and with a supply-hopper, of an endless-band feeder supported below the supply-hopper and having carrier-rolls whose shafts are journaled in suitable bearings in the framework; a bevel-gear fixed to one of the shafts of the feeder; a horizontally-disposed driven shaft journaled in suitable bearings in the framework and having a bevel-gear meshing with the bevel-gear of the feeder-shaft; a pinion fixed to the inner end of the driven shaft; a relatively large internal gear fixed to the driven shaft intermediate the pinion and bevel-gear; a driving-shaft supported in suitable bearings on the framework below said driven shaft and having a pinion meshing with the internal gear of said driven shaft; a driving-sheave fixed to the driving-shaft; an internal gear of large diameter loosely mounted on the driving-shaft between the sheave and the pinion thereof and meshing with the pinion of the driven shaft and having a sheave; a sheave loosely mounted on the hub of the sheave fixed to the driving-shaft; a band or belt in connection with one of the sheaves; two coöperatively-connected cut-off valves disposed in operative relation with the discharge end of the feeder; a valve-actuator; and means in connection with, and operated by, the valve-actuator for shifting the band from one to another sheave at predetermined points in the movements of the load-receiver to change the velocity of said feeder.

FRANCIS H. RICHARDS.

Witnesses:
F. N. CHASE,
JOHN O. SEIFERT.